United States Patent
Guo et al.

(10) Patent No.: US 9,320,077 B2
(45) Date of Patent: Apr. 19, 2016

(54) METHOD AND APPARATUS FOR REDUCING SIGNALING OVERHEAD IN A WIRELESS COMMUNICATION NETWORK

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 142 days.

(21) Appl. No.: 13/941,974

(22) Filed: Jul. 15, 2013

(65) Prior Publication Data

US 2014/0022990 A1  Jan. 23, 2014

Related U.S. Application Data

(60) Provisional application No. 61/672,429, filed on Jul. 17, 2012.

(51) Int. Cl.
*H04W 4/00* (2009.01)
*H04W 76/04* (2009.01)
*H04W 36/00* (2009.01)
*H04W 24/10* (2009.01)

(52) U.S. Cl.
CPC ............ *H04W 76/046* (2013.01); *H04W 24/10* (2013.01); *H04W 36/005* (2013.01)

(58) Field of Classification Search
None
See application file for complete search history.

(56) References Cited

U.S. PATENT DOCUMENTS

| | | | |
|---|---|---|---|
| 2003/0100291 A1* | 5/2003 | Krishnarajah et al. | 455/410 |
| 2007/0153793 A1* | 7/2007 | Jiang | 370/390 |
| 2009/0181710 A1 | 7/2009 | Pani et al. | |
| 2010/0195507 A1* | 8/2010 | Marinier et al. | 370/242 |
| 2011/0183662 A1 | 7/2011 | Lee et al. | |
| 2011/0263222 A1* | 10/2011 | Farnsworth et al. | 455/410 |
| 2011/0269448 A1* | 11/2011 | Chen | 455/422.1 |
| 2011/0319115 A1* | 12/2011 | Racz | 455/514 |
| 2012/0028611 A1* | 2/2012 | Wu | 455/411 |
| 2012/0040677 A1* | 2/2012 | Chen | 455/436 |
| 2012/0051283 A1* | 3/2012 | Takahashi et al. | 370/315 |
| 2012/0108241 A1* | 5/2012 | Wu | 455/436 |
| 2012/0202478 A1* | 8/2012 | Van Lieshout et al. | 455/419 |
| 2012/0281566 A1* | 11/2012 | Pelletier et al. | 370/252 |
| 2013/0010631 A1* | 1/2013 | Jung et al. | 370/252 |
| 2013/0137379 A1* | 5/2013 | Jung et al. | 455/67.11 |
| 2013/0196604 A1* | 8/2013 | Jung et al. | 455/67.11 |

(Continued)

OTHER PUBLICATIONS

3GPP TSG RAN WG2 #59bis, Oct. 8-12, 2008, Shanghai, China.

(Continued)

*Primary Examiner* — Bunjob Jaroenchonwanit
(74) *Attorney, Agent, or Firm* — Blue Capital Law Firm, P.C.

(57) ABSTRACT

A method and apparatus are disclosed for reducing signaling overhead in a wireless communication network. In one embodiment, the method is implemented in a network node. The method includes transmitting a first indication to a UE (User Equipment) to tell the UE to remember a configuration which is currently used after the UE enters RRC_IDLE. In an alternative embodiment, the method is implemented in a UE. The method includes (i) receiving a first indication from the network node to tell the UE to remember a configuration which is currently used after the UE enters RRC_IDLE, and (ii) retaining and not releasing or discarding the configuration upon leaving RRC_CONNECTED.

14 Claims, 9 Drawing Sheets

(56) References Cited

U.S. PATENT DOCUMENTS

| | | | |
|---|---|---|---|
| 2013/0303129 A1* | 11/2013 | Yi et al. | 455/411 |
| 2013/0329635 A1* | 12/2013 | Lee et al. | 370/328 |
| 2013/0343280 A1* | 12/2013 | Lee et al. | 370/328 |
| 2014/0016593 A1* | 1/2014 | Park et al. | 370/329 |
| 2014/0056243 A1* | 2/2014 | Pelletier et al. | 370/329 |
| 2014/0155114 A1* | 6/2014 | Wu | 455/509 |

OTHER PUBLICATIONS

3GPP TSG-RAN WG2 Meeting #75, Athens, Greece, Aug. 22-26, 2011.

3GPP TSG-RAN WG5 Meeting #38, Malaga, Spain, Jan. 28-Feb. 1, 2008.

Search Report on corresponding EP Patent Application No. 13003604.9 dated Nov. 21, 2013.

* cited by examiner

METHOD AND APPARATUS FOR REDUCING SIGNALING OVERHEAD IN A WIRELESS COMMUNICATION NETWORK

CROSS-REFERENCE TO RELATED APPLICATIONS

The present Application claims the benefit of U.S. Provisional Patent Application Ser. No. 61/672,429 filed on Jul. 17, 2012, the entire disclosure of which is incorporated herein by reference.

FIELD

This disclosure generally relates to wireless communication networks, and more particularly, to a method and apparatus for reducing signaling overhead in a wireless communication network.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for reducing signaling overhead in a wireless communication network. In one embodiment, the method is implemented in a network node. The method includes transmitting a first indication to a UE (User Equipment) to tell the UE to remember a configuration which is currently used after the UE enters RRC_IDLE. The method could also include transmitting a second indication to the UE to tell the UE to use a configuration which was used during the last time the UE was in RRC_CONNECTED. The method could also include receiving a third indication from the UE to indicate that the UE wants to use the configuration which was used during the last time the UE was in RRC_CONNECTED. In an alternative embodiment, the method is implemented in a UE. The method includes (i) receiving a first indication from the network node to tell the UE to remember a configuration which is currently used after the UE enters RRC_IDLE, and (ii) retaining and not releasing or discarding the configuration upon leaving RRC_CONNECTED. The method could further include receiving a second indication from the network node to tell the UE to use the configuration which was used during the last time the UE was in RRC_CONNECTED. The method could also include transmitting a third indication to the network node to indicate that the UE wants to use the configuration which was used during the last time the UE was in RRC_CONNECTED.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RWS-120050, "LG's view on evolution of LTE in Release 12 and beyond", LG; RWS-120014, "Towards LTE RAN Evolution", Alcatel-Lucent; RWS-120003, "Views on Rel-12", Ericsson; RWS-120006, "Views on Rel-12 and onwards for LTE and UMTS", Huawei; RWS-120011, "Where to improve Rel-12 and beyond: Promising technologies", NEC; TS 36.331 V11.0.0, "E-UTRA RRC protocol specification (Release 11)"; and 3GPP TS 33.401 V11.4.0, "3GPP System Architecture Evolution (SAE); Security architecture". The standards and documents listed above are hereby expressly incorporated herein.

Figure 1:
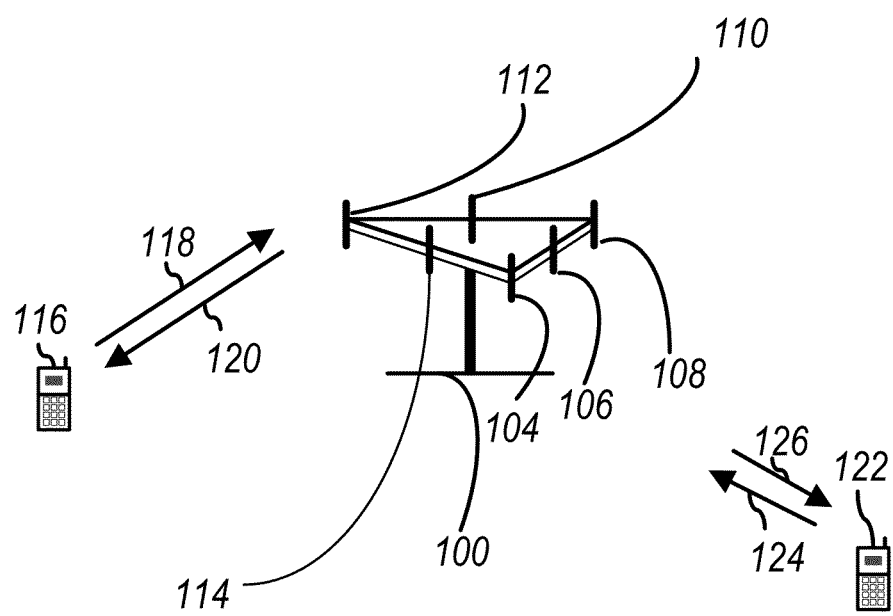
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
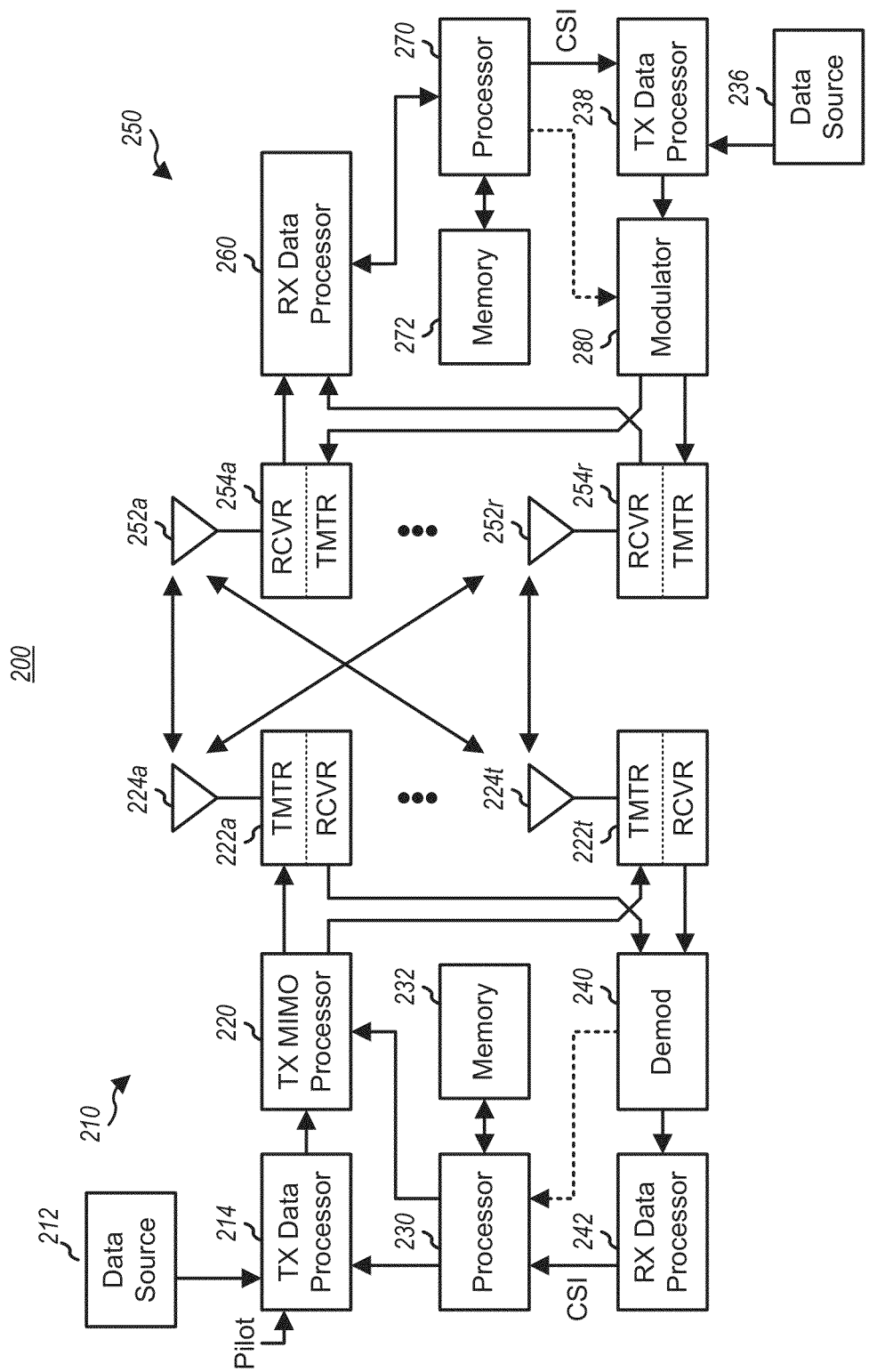
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
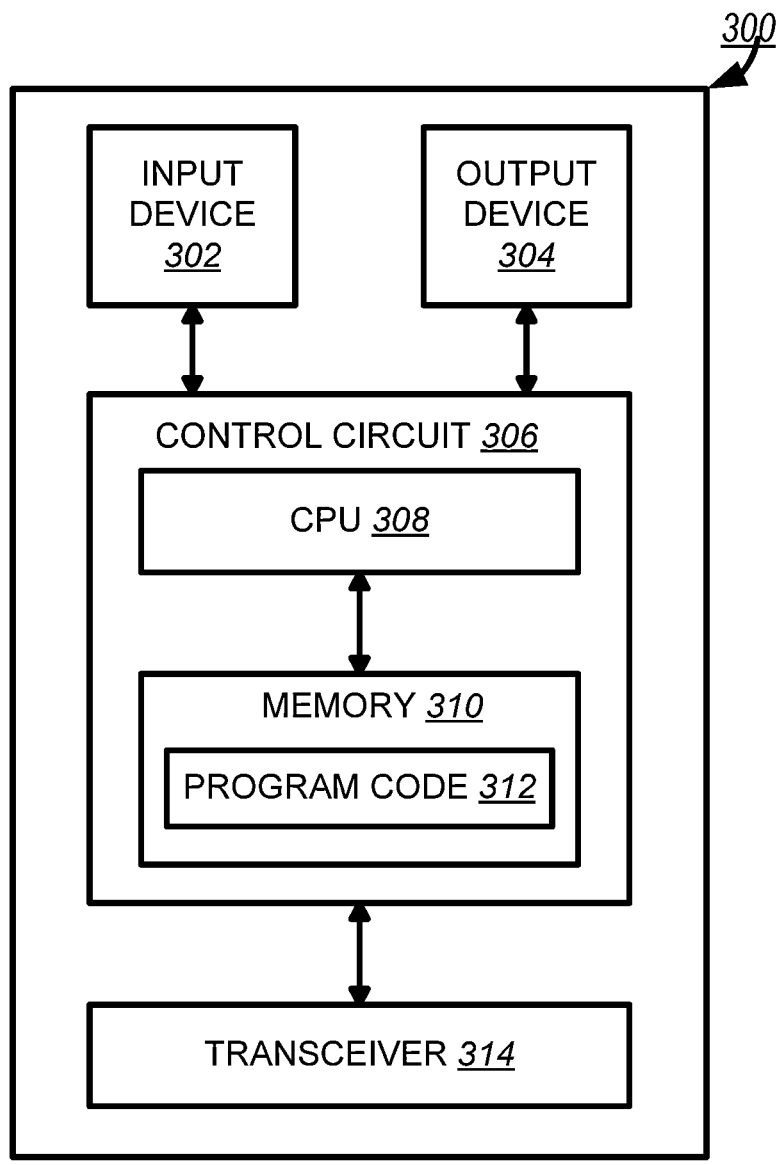
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
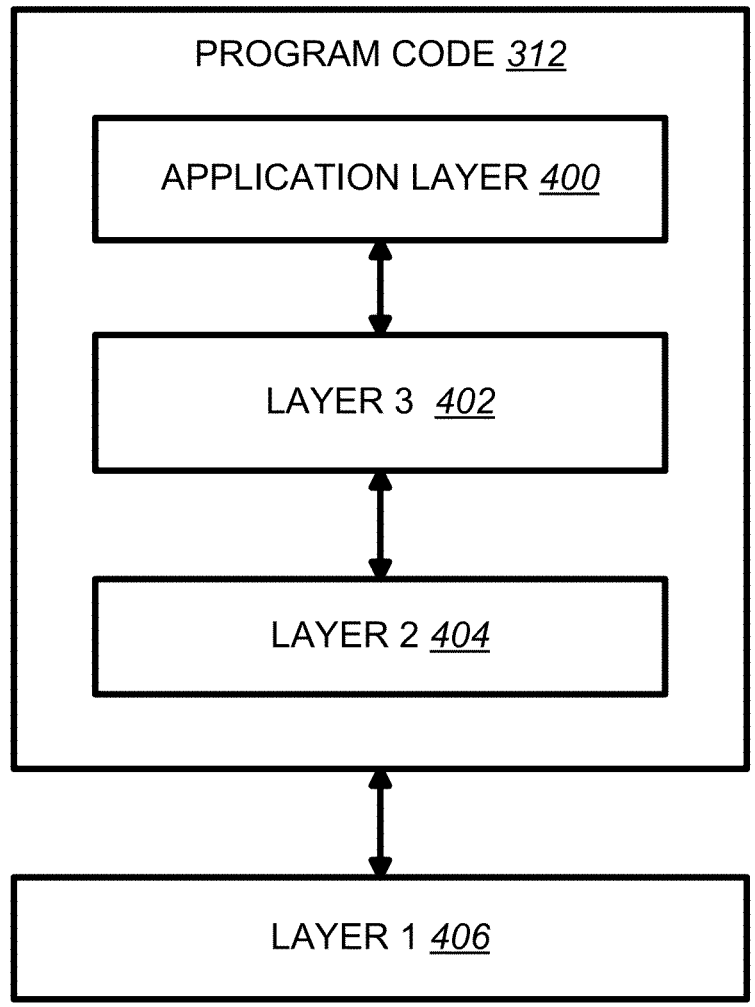
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
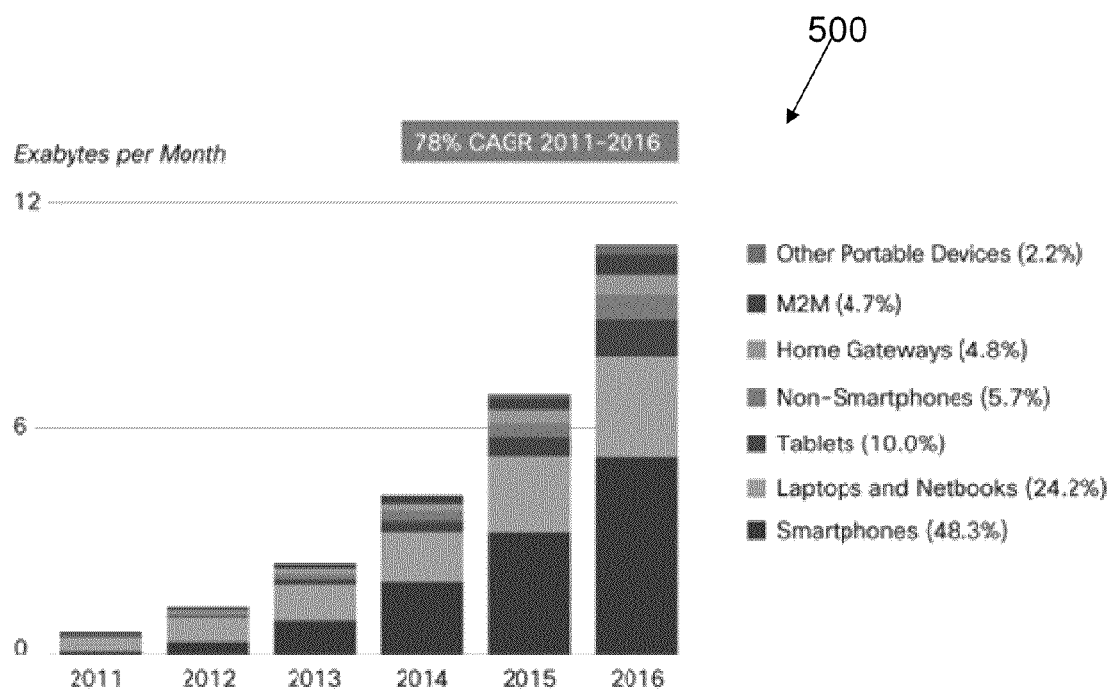
FIG. 5 is a histogram illustrating traffic amount for different devices according to one exemplary embodiment.

FIG. 5 is a histogram 500 illustrating traffic amount for difference devices in accordance with one exemplary embodiment. The histogram 500 can be found in 3GPP RWS-120050. As illustrated in to FIG. 5, the number of devices and traffic amount per device grows virtually exponentially every year. Furthermore, it is pointed out in 3GPP RWS-120014 that in 2020, there would be 20 billion M2M devices where 500% M2M (Machine To Machine) traffic would be increased and 83% of M2M revenue would be generated from value-added services. In addition, as discussed in 3GPP RWS-120003, it is expected that in the future, there would be a wide range of applications with very different requirements using machine type communication (MTC), such as consumer electronics, smart grid, surveillance, epayment, security, smart transportation, etc. Thus, it is mentioned that the following aspects are important to improve MTC:

Low-cost devices
Reduced power consumption
Signaling load reductions

Furthermore, 3GPP RWS-120006 proposes several MTC optimizations for Rel-12 as follows:

Efficient support of large amount of MTC devices with small data transmission
RRC signaling reduction
Efficient physical layer resource usage (e.g. PDCCH/PUCCH/SRS)
Low power consumption for MTC devices
Co-work with SA2 for MTC enhancements In addition, as considered and discussed in 3GPP RWS-120011, diverse data applications (DDA) have similar problems as MTC as follows:

In Rel-10 and Rel-11, enhancements for MTC and diverse data applications have been introduced. Traffic/congestion management based on application types is studied for Rel-12.
However, RRC in RAN is still inefficient in terms of management overhead for applications with in-frequent, small-volume packet traffic.

Therefore, 3GPP RWS-120011 proposes the following optimizations for both MTC and DDA:

Reduced state and control plane overhead
Lower energy consumption
Better support for diverse data application As seen, one consensus of different documents is to improve MTC or DDA is to reduce signaling overhead. One possible alternative to reduce signaling overhead is to keep all UEs, which runs MTC or DDA for example, in RRC_CONNECTED to reduce signaling used for transition between RRC_IDLE and RRC_CONNECTED. However, due to the increasing number of devices year by year, keeping all UEs in RRC_CONNECTED may not be easily achieved in the future because of insufficient capacity or resources. Thus other alternatives to reduce signaling overhead should also be considered.

Figure 6:
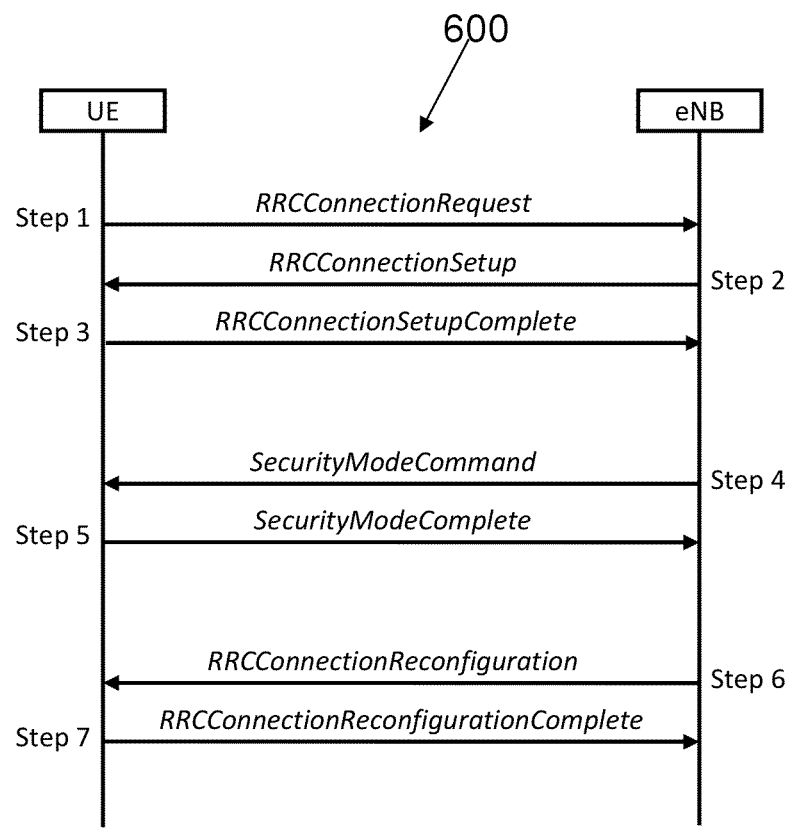
FIG. 6 is a message sequence chart of a RRC (Radio Resource Control) procedure according to one exemplary embodiment.

As discussed in the current RRC specification (3GPP TS 36.331 V11.0.0), every time when a UE enters RRC_CONNECTED from RRC_IDLE to transmit user plane data, three procedures (including RRC connection establishment, security mode command, and RRC connection reconfiguration) are required to be performed following the order shown in FIG. 6:

Steps 1-3: In general, the purpose of this procedure is to establish an RRC connection. RRC connection establishment involves SRB1 establishment. The procedure is also used to transfer the initial NAS dedicated information/message from the UE to E-UTRAN.
Steps 4-5: In general, the purpose of this procedure is to activate AS security upon RRC connection establishment.
Steps 6-7: In general, the purpose of this procedure is to modify an RRC connection, such as to establish/modify/release RBs, to perform handover, to setup/modify/release measurements, to add/modify/release SCells. As part of the procedure, NAS dedicated information may be transferred from E-UTRAN to the UE.

For some types of MTC devices or for some specific types of data applications, a UE performs state transition from an idle state to a connected state just for the purpose of transmitting a small amount of data. In such cases, the amount of signaling caused by the RRC procedures is quite significant compared with the amount of the transmitted user data. If the RRC procedures required for transition from RRC_IDLE to RRC_CONNECTED could be simplified, the signaling overhead could be reduced.

For a stationary or low mobility UE running MTC or DDA, the radio condition, required resources, and/or on-going applications may not be changed frequently. As a result, when the UE enters RRC_CONNECTED to transmit data, the required RB (Radio Bearer) configuration for SRB (Signaling Radio Bearer) and/or DRB (Data Radio Bearer), MAC (Medium Access Control) configuration, physical channel configuration, and/or measurement configuration may be quite similar or (partially) the same.

Based on above, the general concept of the invention is to re-use the configuration during last time a UE in RRC_CONNECTED so that the previous configuration could be used as the basis for delta signaling, or the whole procedure could be omitted.

If the UE's previous configuration (which was applied during last time the UE in RRC_CONNECTED) could be reused, the configuration would not need to be signaled, and thus the signaling overhead of the RRC connection reconfiguration procedure could be reduced (for example, by treating the configuration applied during last time as the basis for delta signaling, or by even omitting the entire RRC connection reconfiguration procedure). Furthermore, if security key(s), such as $K_{eNB}$ described in 3GPP TS 33.401 V11.4.0, and/or security algorithm(s) of a UE applied during last time the UE in RRC_CONNECTED could be reused, signaling overhead of the security mode command procedure could be reduced or omitted altogether. As a result, signaling overhead could be reduced by reusing previous configuration when a specific UE enters RRC_CONNECTED from RRC_IDLE and by omitting the security procedure and/or RRC connection reconfiguration procedure.

One concern may be how to synchronize UE configuration between the UE and network or eNB. Currently, as discussed in 3GPP TS 36.331 V11.0.0, S-TMSI (System Architecture Evolution Temporary Mobile Station Identifier) is included in the RRCConnectionRequest message if the UE is registered in the TA of the current cell. The eNB could store the previous UE configuration and could identify the UE by the S-TMSI. As a result, there would be no configuration synchronization problem.

Figure 7:
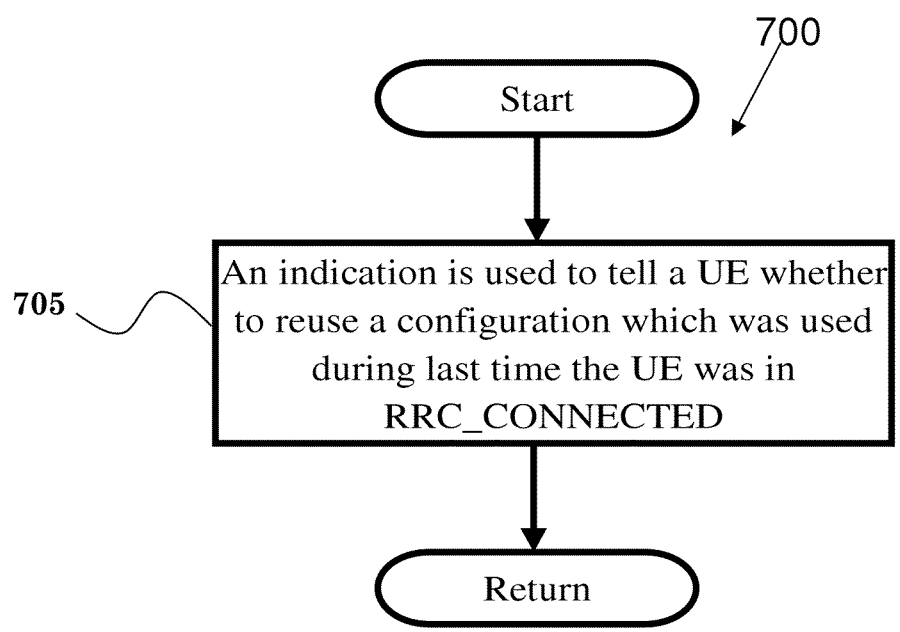
FIGS. 7, 8, and 9 are flow charts according to exemplary embodiments.

FIG. 7 is a flow chart 700 in accordance with an exemplary embodiment. In step 705 of FIG. 7, an indication is used to tell a UE whether or not to reuse a configuration which was used during last time the UE was in RRC_CONNECTED. The indication is transmitted by a network node, such as eNB. The UE could use or apply the configuration upon receiving the indication. The configuration could be the configuration of the UE during the last or previous time when the UE was in RRC_CONNECTED. Furthermore, the configuration was not included in an RRCConnectionSetup message. In one embodiment, the indication could be included in an RRCConnectionSetup message. Alternatively, the indication could be included in an RRCConnectionReconfiguration message.

Figure 8:
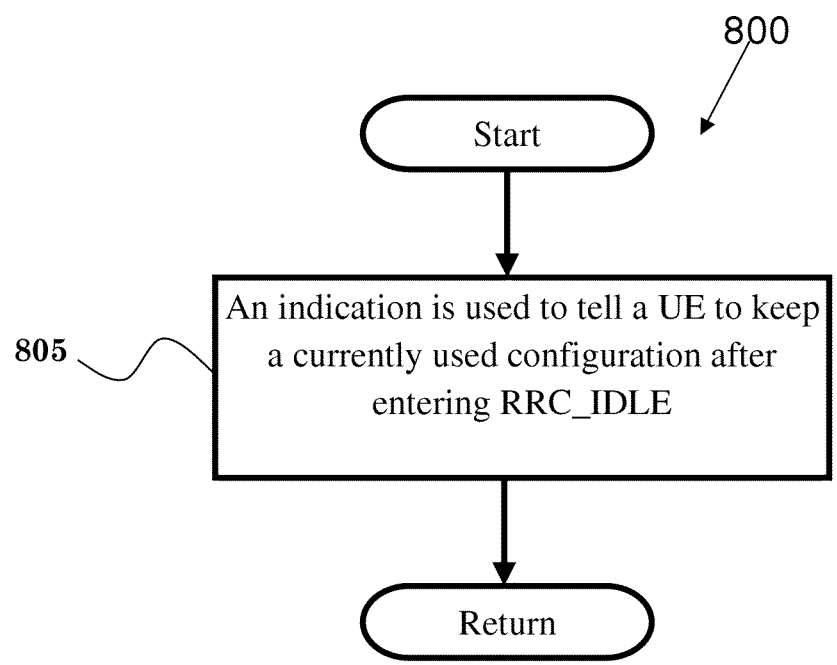

FIG. 8 is a flow chart 800 in accordance with an exemplary embodiment. In step 805 of FIG. 8, an indication is used to tell a UE to keep or retain a configuration which is currently used after entering RRC_IDLE. The indication is transmitted by a network node, such as eNB. After the UE receives the indication, the UE retains and does not release or discard the configuration upon leaving RRC_CONNECTED. However, the configuration may be released or discarded in at least one of the following conditions: (i) when a RRC connection re-establishment procedure is initiated or completed, (ii) when the UE connects to a cell or eNB or TA or RAT which is different from the cell or eNB or TA or RAT where the indication was received, or (iii) when the UE changes S-TMSI. In one embodiment, the indication could be included in an RRCConnectionSetup message. Alternatively, the indication could be included in an RRCConnectionReconfiguration message or an RRCConnectionRelease message.

Figure 9:
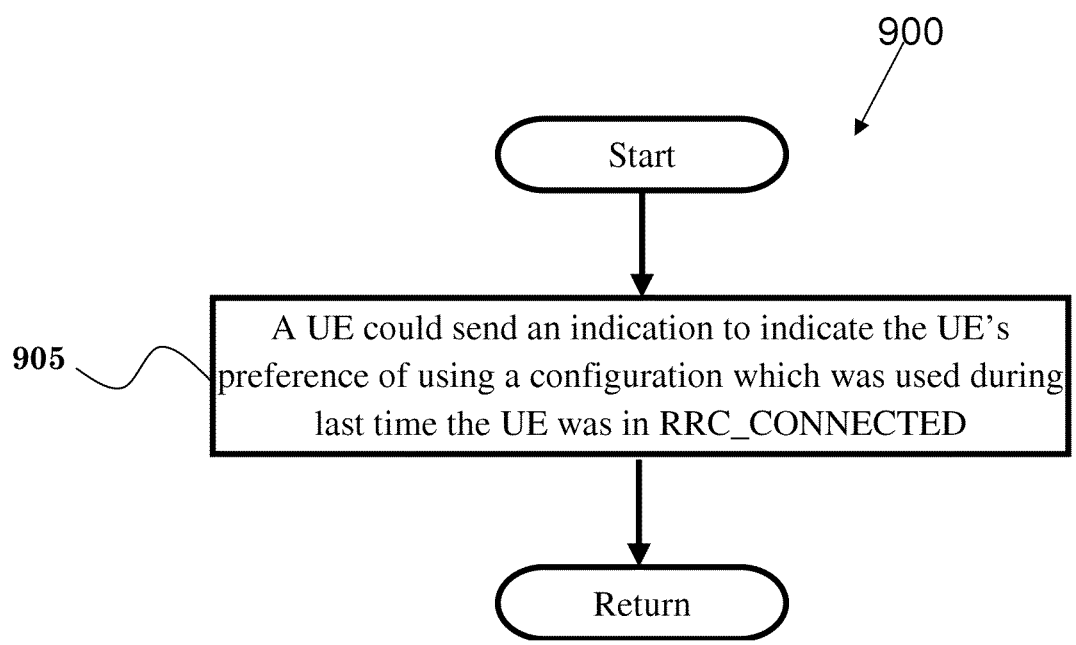

FIG. 9 is a flow chart 900 in accordance with an exemplary embodiment. In step 905 of FIG. 9, a UE could send an indication to indicate the UE's preference of using a configuration that was used during last time the UE was in RRC_CONNECTED. The indication is received by a network node, such as eNB. The UE stores the configuration which was used during last time the UE was in RRC_CONNECTED. In other words, the stored configuration could be the configuration of the UE during the last time the UE was in RRC_CONNECTED. In one embodiment, the indication could be included in an RRCConnectionRequest message. Alternatively, the indication could be included in an RRCConnectionSetupComplete message. In addition, the location of the UE may be the same as the location last time the UE in RRC_CONNECTED. Furthermore, the UE may connect to an eNB or cell which is the same eNB or cell that the UE connected to the UE during the last time the UE was in RRC_CONNECTED. Also, the UE may enter RRC_CONNECTED triggered by an application(s) which is the same application(s) as last time triggering the UE entering RRC_CONNECTED.

In one embodiment, the configuration can include at least one of the following: (i) a security configuration, such as security key, KeNB, ciphering algorithm, or integrity protection algorithm, (ii) a measurement configuration, or (iii) a radio resource configuration, such as radio bearer configuration for SRB or DRB, MAC configuration, or physical channel configuration.

Referring back to FIGS. 3 and 4, in one embodiment, the device 300 implements a network node (such as eNB) and includes a program code 312 stored in memory 310. In one embodiment, the CPU 308 could execute the program code 312 to transmit a first indication to a UE to tell the UE to remember a configuration which is currently used after the UE enters RRC_IDLE. The CPU 308 could also execute the program 312 to transmit a second indication to a UE to tell the UE to use a configuration which was used during the last time the UE was in RRC_CONNECTED. The CPU 308 could further execute the program 312 to receive a third indication from the UE to indicate that the UE wants to use the configuration which was used during the last time the UE was in RRC_CONNECTED. In addition, the CPU 308 can execute the program code 312 to perform all of the above-described actions and steps or others described herein.

Referring back to FIGS. 3 and 4, in an alternative embodiment, the device 300 implements a UE and includes a program code 312 stored in memory 310. In one embodiment, the CPU 308 could execute the program code 312 (i) to receive a first indication from the network node to tell the UE to remember a configuration which is currently used after the UE enters RRC_IDLE, and (ii) to retain and not release or discard the configuration upon leaving RRC_CONNECTED. The CPU 308 could further execute the program code 312 to receive a second indication from the network node to tell the UE to use the configuration which was used during the last time the UE was in RRC_CONNECTED. The CPU 308 could also execute the program code 312 to transmit a third indication to the network node to indicate that the UE wants to use the configuration which was used during the last time the UE was in RRC_CONNECTED. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method implemented in a network node for reducing signaling overhead, comprising:
    transmitting a first indication to a UE (User Equipment) to tell the UE to remember, after the UE enters RRC_IDLE, a first configuration which is currently used while the UE is in RRC_CONNECTED;
    receiving a third indication from the UE to indicate that the UE wants to reuse the first configuration which was used during the last time the UE was in RRC_CONNECTED; and
    transmitting a second indication to the UE to tell the UE to reuse the first configuration which was used during the last time the UE was in RRC_CONNECTED.

2. The method of claim 1, wherein the first indication is included in an RRCConnectionSetup message, an RRCConnectionReconfiguration message, or an RRCConnectionRelease message.

3. The method of claim 1, wherein the first configuration includes at least one of the following: (i) a security configuration, (ii) a measurement configuration, or (iii) a radio resource configuration.

4. A network node in a wireless communications system for reducing signaling overhead, the network node comprising:
    a control circuit for realizing functions of the network node;
    a central processing unit coupled to the control circuit for executing a program code to operate the control circuit; and
    a memory coupled to the central processing unit for storing the program code;
    wherein the program code comprises:
        transmitting a first indication to a UE (User Equipment) to tell the UE to remember, after the UE enters RRC_IDLE, a first configuration which is currently used while the UE is in RRC_CONNECTED;
        receiving a third indication from the UE to indicate that the UE wants to reuse the first configuration which was used during the last time the UE was in RRC_CONNECTED; and
        transmitting a second indication to the UE to tell the UE to reuse the first configuration which was used during the last time the UE was in RRC_CONNECTED.

5. The network node of claim 4, wherein the first indication is included in an RRCConnectionSetup message, an RRCConnectionReconfiguration message, or an RRCConnectionRelease message.

6. The network node of claim 4, wherein the first configuration includes at least one of the following: (i) a security configuration, (ii) a measurement configuration, or (iii) a radio resource configuration.

7. A method implemented in a UE (User Equipment) for reducing signaling overhead, comprising:
    receiving a first indication from a network node to tell the UE to remember, after the UE enters RRC_IDLE, a first configuration which is currently used while the UE is in RRC_CONNECTED;
    keeping the first configuration upon leaving RRC_CONNECTED;
    transmitting a third indication to the network node to indicate that the UE wants to reuse the first configuration which was used during the last time the UE was in RRC_CONNECTED; and
    receiving a second indication from a network node to tell the UE to reuse the first configuration which was used during the last time the UE was in RRC_CONNECTED.

8. The method of claim 7, wherein the first indication is included in an RRCConnectionSetup message, an RRCConnectionReconfiguration message, or an RRCConnectionRelease message.

9. The method of claim 7, further comprises:
    releasing the first configuration when one or more of the following conditions occurs: (i) when a Radio Resource Control (RRC) connection re-establishment procedure is initiated or completed, (ii) when the UE connects to a cell, evolved Node B (eNB), or Tracking Area (TA) which is different from where the first indication was received, or (iii) when the UE changes System Architecture Evolution Temporary Mobile Station Identifier (S-TMSI).

10. The method of claim 7, wherein the first configuration includes at least one of the following: (i) a security configuration, (ii) a measurement configuration, or (iii) a radio resource configuration.

11. A UE (User Equipment) in a wireless communications system for reducing signaling overhead, the UE comprising:
a control circuit for realizing functions of the UE;
a central processing unit coupled to the control circuit for executing a program code to operate the control circuit; and
a memory coupled to the central processing unit for storing the program code;
wherein the program code comprises:
receiving a first indication from a network node to tell the UE to remember, after the UE enters RRC_IDLE, a first configuration which is currently used while the UE is in RRC_CONNECTED;
keeping the first configuration upon leaving RRC_CONNECTED;
transmitting a third indication to the network node to indicate that the UE wants to reuse the first configuration which was used during the last time the UE was in RRC_CONNECTED; and
receiving a second indication from a network node to tell the UE to reuse the first configuration which was used during the last time the UE was in RRC_CONNECTED.

12. The UE of claim 11, further comprises:
releasing the first configuration when one or more of the following conditions occurs: (i) when a Radio Resource Control (RRC) connection re-establishment procedure is initiated or completed, (ii) when the UE connects to a cell, evolved Node B (eNB), or Tracking Area (TA) which is different from where the first indication was received, or (iii) when the UE changes System Architecture Evolution Temporary Mobile Station Identifier (S-TMSI).

13. The UE of claim 11, wherein the first configuration includes at least one of the following: (i) a security configuration, (ii) a measurement configuration, or (iii) a radio resource configuration.

14. The UE of claim 11, wherein the first indication is included in an RRCConnectionSetup message, an RRCConnectionReconfiguration message, or an RRCConnectionRelease message.

* * * * *